Patented July 24, 1951

2,561,526

UNITED STATES PATENT OFFICE 2,561,526

PRODUCTION OF PURE DUCTILE VANADIUM FROM VANADIUM OXIDE

Robert K. McKechnie, Ballston Lake, and Alan U. Seybolt, Scotia, N. Y., and John E. Gray, New Alexandria, Va., assignors to the United States of America as represented by the United States Atomic Energy Commission No Drawing. Application September 30, 1949, Serial No. 119,012

3 Claims. (Cl. 75—84)

This invention relates to the manufacture of metallic vanadium and more particularly to the preparation of ductile vanadium in the form of massive bodies which can easily be worked into desired shapes because of their malleability.

"The problem of preparing pure metallic vanadium has presented numerous difficulties. A large number of attempts have been made by various workers, using a variety of methods, but in general the results have been disappointing." The two preceding sentences have been quoted verbatim from page 6 of chapter 14 in "Chapters in the Chemistry of the Less Familiar Elements" by B. Smith Hopkins. Then after describing briefly a number of attempts to obtain metallic vanadium, Hopkins on page 7 says, "This formidable array of serious efforts and the mediocre results generally obtained makes it clear that the production of pure vanadium is a difficult task."

The best previously known method of producing metallic vanadium, which was devised by Marden and Rich, involved the reduction of $V_2O_5$ with metallic calcium in a flux composed of calcium chloride. This method of producing vanadium suffers from the drawback that the metallic vanadium is obtained in the form of small particles which range in size from small pellets to fine dust. These small particles of vanadium must then be sintered and agglomerated in order to form a coherent body of vanadium that can be mechanically fabricated in accordance with conventional metal working methods. Applicants have found that due to rather low yields and difficulties in recovery the Marden and Rich method is of no value other than for a laboratory scale production of vanadium. Applicants thereby have confirmed Hopkins' contention that "this method of production does not look promising from a commercial point of view."

This invention has as an object the provision of a commercially feasible method of obtaining metallic vanadium. A further object is to provide a method of obtaining metallic vanadium in the form of a massive body which can be readily fabricated in accordance with conventional methods for working malleable metals. A still further object is to provide a method of manufacturing ductible vanadium in which the production of small metallic particles which must be sintered and agglomerated is very greatly reduced and a massive regulus of vanadium is obtained. Other objects will appear hereinafter.

These objects are accomplished in accordance with the present invention by reacting a mixture containing vanadium pentoxide and at least 0.05 mol of iodine per mol of $V_2O_5$ with at least 40% more metallic calcium than is stoichiometrically needed to react with said vanadium pentoxide and iodine; and then separating the massive body of ductile vanadium thereby obtained from the slag produced in the reaction.

This invention is illustrated but not limited by the following example:

Example

An intimate mixture of 280 parts by weight of chemically pure $V_2O_5$ 625 parts by weight of high purity calcium and 78 parts by weight of chemically pure iodine was made by tumbling in a closed container for about five minutes. This mixture was charged into a high fired, magnesia liner with a lid and the assembly loaded into a steel bomb lined with about ¼ inch of refractory sand. Refractory sand was poured over the closed liner with about a ½ inch layer on top. The bomb was sealed, the contents evacuated and filled three times with pure argon gas.

This assembly was placed in a high frequency field and heated eight minutes. The main reduction reaction was noted at about seven minutes by a crackling noise within the bomb followed by the rapid heating of the bomb, a maximum temperature of about 737° C. being obtained.

Next day the bomb was opened and examined. While some of the excess calcium had condensed on the walls of the bomb, it appeared that most of the excess calcium was mixed with the slag. The slag, which was principally CaO, looked fused near the top of the bomb and appeared as gold colored crystals near the bottom. It was found that a fairly well collected regulus of metallic vanadium had formed near the bottom of the bomb. This regulus accounted for about 70% of the metallic vanadium that is theoretically obtainable in this reaction. The rest of the vanadium was in small shots or pellets dispersed through the slag. The regulus was washed with water to free it from any adhering slag. The vanadium regulus produced in this way was reduced to 1% of its original thickness by cold rolling without any intermediate annealing. Bright, lustrous vanadium foil having a smooth finish and a thickness of 2.5 mils was obtained from this regulus by a multi-stage reduction effected by a plurality of passes between cold rolls. It may therefore be appreciated that the vanadium metal obtained in accordance with applicants' invention is extremely ductile.

In order to obtain ductile vanadium in accordance with the process illustrated in the above example it is highly important to use very pure $V_2O_5$. The nitrogen contact of the $V_2O_5$ should be less than 0.03% to obtain ductile vanadium.

It is not sufficient in itself to specify the use of chemically pure $V_2O_5$ as commercially supplied in order to produce ductile metal. It has been found that $V_2O_5$ with a residual nitrogen content greater than 0.03% by weight reduces to vanadium that is not ductile. In view of the variation in residual nitrogen which is found in the commercial preparations of $V_2O_5$, applicants have devised a treatment which insures a $V_2O_5$ low enough in residual nitrogen to produce ductile metal. The treatment is, as follows: Commercial chemically pure $V_2O_5$ is treated in a suitable reactor, such as a vertical tube furnace. A diffusion plug of stainless steel wool is inserted, the $V_2O_5$ powder is charged into the tube, and a second stainless steel wool plug is inserted. Oxygen gas is bubbled through water using a porous plate to insure the formation of many wet bubbles. The wet oxygen is streamed through the bed of $V_2O_5$ in the tube for a period ranging from a minimum of two hours to eighteen hours at a temperature of 400° C.; a longer period might be used but is not necessary.

This process may supplement the process in which chemically pure $V_2O_5$ is produced by calcining ammonium metavanadate ($NH_4VO_3$) with an excess of oxygen. Applicants have found that wet oxygen must be used as the final step in the calcining process and that the water present in the oxygen stream aids in breaking down nitrogen compounds formed in the calcining in order to oxidize these compounds to $V_2O_5$. Applicants have also found that the use of dry oxygen is not sufficient to yield $V_2O_5$ which can reproducibly yield ductile vanadium.

It is important that the reaction mixture contain at least 0.05 mol of iodine per mol of $V_2O_5$. Usually the amount of iodine employed varies from about 0.2 mol to about 0.4 mol per mol of $V_2O_5$. The amount of metallic vanadium collected in the regulus appears to increase slightly as increasing proportions of iodine are employed in the reaction mixture. The reaction between the calcium and iodine serves to heat up the reaction mixture in the bomb to a sufficiently high temperature to initiate the reduction of the $V_2O_5$ by the calcium. The addition of iodine to the reaction mixture serves to smooth out the main reduction reaction which is not under control when no iodine is used and also has a small effect in lowering the melting point of the slag produced in the reaction. The reaction between $V_2O_5$ and calcium is highly exothermic so that once it has been started it readily goes to completion.

It is important that at least 40%, and preferably from about 50% to about 100% more calcium than is stoichiometrically needed to react with the $V_2O_5$ and iodine in the reaction mixture be initially present in the reaction mixture. The excess calcium serves to flux the calcium oxide produced in the reaction. In addition, the excess calcium has a gettering effect on any nitrogen remaining in the bomb after the precautions described above have been taken to keep nitrogen as low as possible. Applicants avoid the use of calcium chloride as a flux. If $V_2O_5$ containing more than the desired residual nitrogen content is employed, it has been found that the ductility of the vanadium obtained improves as increasing amounts of excess calcium are used. The amount of metallic vanadium obtained in the regulus appears to be somewhat greater when about 50% excess of calcium is employed than when about 100% excess of calcium is used.

It is important to purge the bomb of its air atmosphere which would be detrimental in furnishing nitrogen. Accordingly the bomb is evacuated and flushed with argon or some other nitrogen free inert gas such as neon or helium.

The reaction mixture used in this invention initially consists of vanadium pentoxide, calcium and iodine. The particle size of the $V_2O_5$ used has been a −100 mesh +325 mesh powder. The calcium normally used has been a −10 mesh +50 mesh coarse powder. Reductions have also been made using ¼ inch granules of calcium, but when these granules are used the amount of vanadium collected in the regulus decreases slightly. Iodine is used as resublimed crystals which disperse by volatilization during the early stages of heating. After the reaction has gone to completion the contents of the reaction bomb consist of calcium oxide, calcium iodide, free calcium and free vanadium.

Magnesium may not be used in place of calcium in this invention since magnesium is only effective to reduce $V_2O_5$ to $V_2O_3$.

This invention provides a commercially feasible process for manufacturing massive bodies of ductile vanadium in contrast to the laboratory processes of making small particles of metallic vanadium, which were known to the prior art.

Resort may be had to such modifications and variations as conform to the spirit of the invention and come within the scope of the appended claims.

We claim:

1. A process for obtaining a massive body of ductile vanadium which comprises forming a reaction mixture consisting of vanadium pentoxide, from 0.05 mol to 0.4 mol of iodine per mol of vanadium pentoxide, and at least 40% more metallic calcium than is stoichiometrically needed to react with said vanadium pentoxide and iodine, charging said reaction mixture to a bomb, heating the bomb up to the reaction temperature, and then after the reaction is over separating the massive body of ductile vanadium thereby obtained from the slag produced in the reaction.

2. A process for obtaining a massive body of ductile vanadium which comprises forming a reaction mixture consisting of vanadium pentoxide containing less than 0.03% of residual nitrogen, from 0.05 mol to 0.4 mol of iodine per mol of vanadium pentoxide, and from about 50% to about 100% more metallic calcium than is stoichiometrically needed to react with said vanadium pentoxide and iodine, charging said reaction mixture to a bomb, heating the bomb up to the reaction temperature, and then after the reaction is over separating the massive body of ductile vanadium thereby obtained from the slag produced in the reaction.

3. A process for obtaining a massive body of ductile vanadium which comprises forming a reaction mixture consisting of vanadium pentoxide, the residual nitrogen content of which has been reduced to less than 0.03% by heat treatment of the pentoxide with wet oxygen at 400° C., from about 0.2 mol to about 0.4 mol of iodine per mol of vanadium pentoxide, and from about 50% to about 100% more metallic calcium than is stoichiometrically needed to react with said vanadium pentoxide and iodine, charging said reaction mixture to a bomb, purging the atmospheric gases contained in said bomb and replacing them with a nitrogen free inert gas, heating the bomb up to the reaction temperature, and then after the reaction has subsided and the reaction mass has cooled separating the massive body of ductile vanadium thereby obtained from the slag produced in the reaction.

ROBERT K. McKECHNIE.
ALAN U. SEYBOLT.
JOHN E. GRAY.

REFERENCES CITED

The following references are of record in the file of this patent:

UNITED STATES PATENTS

| Number | Name | Date |
|---|---|---|
| 1,533,505 | Lubowsky | Apr. 14, 1925 |
| 1,814,719 | Marden et al. | July 14, 1931 |
| 1,814,720 | Marden et al. | July 14, 1931 |
| 2,446,062 | Rentschler et al. | July 27, 1948 |

OTHER REFERENCES

Comprehensive Treatise on Inorganic and Theoretical Chemistry, by Mellor, vol. 9, page 725, published by Longmans, Green & Co., New York, 1929.